J. ROBERTSON.
MANUFACTURE OF RUBBER TUBES AND MACHINERY THEREFOR.
No. 75,649.            Patented Mar. 17, 1868.
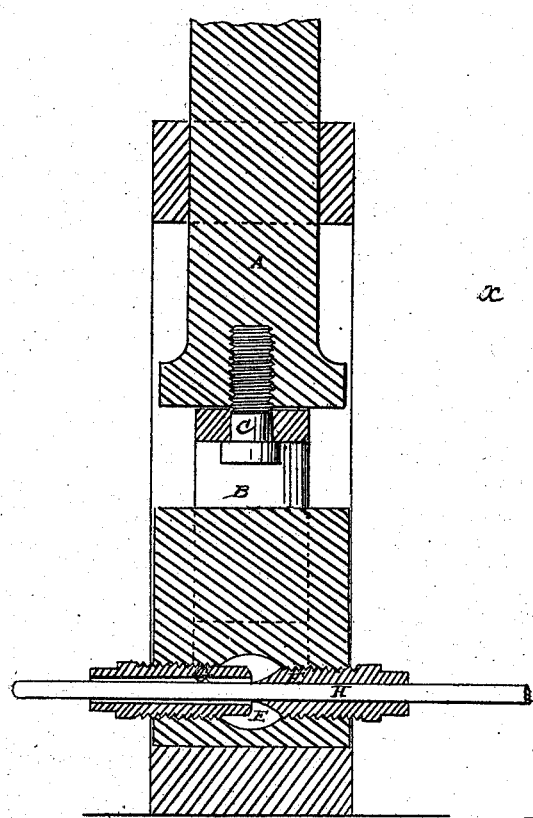
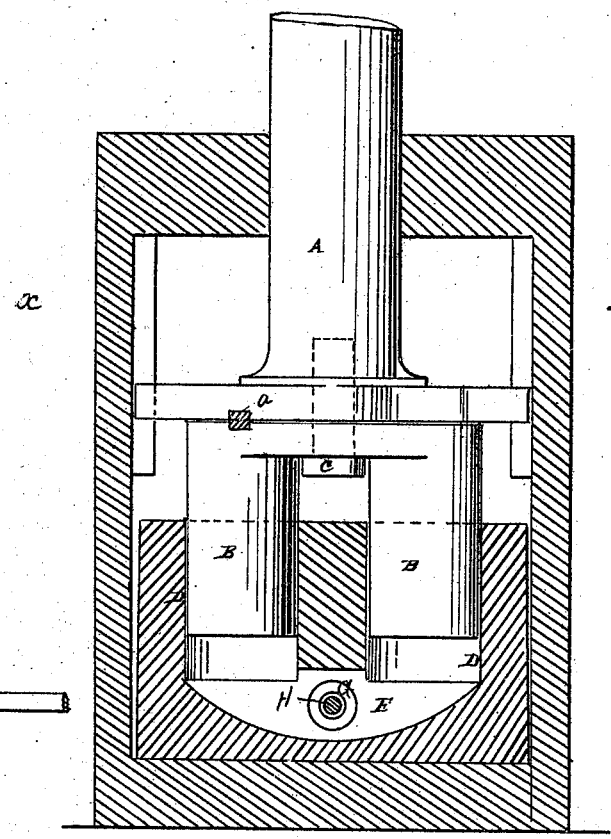
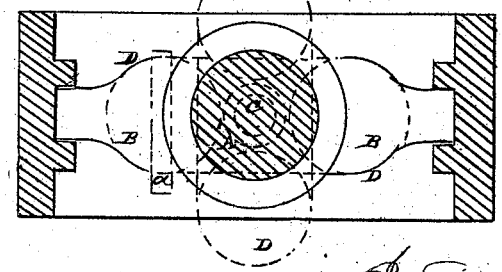

United States Patent Office.

JOHN ROBERTSON, OF BROOKLYN, NEW YORK.

Letters Patent No. 75,649, dated March 17, 1868.

IMPROVEMENT IN THE MANUFACTURE OF RUBBER TUBES, AND IN MACHINERY THEREFOR.

*The Schedule referred to in these Letters Patent and making part of the same.*

TO ALL WHOM IT MAY CONCERN:

Be it known that I, JOHN ROBERTSON, of Brooklyn, in the county of Kings, and State of New York, have invented a new and useful Improvement in the Manufacture of India-Rubber Tubes, or Machinery therefor, applicable also, or in part, to making other gum and like tubing, of which the following is a full, clear, and exact description, reference being had to the accompanying drawing, forming part of this specification, and in which—

Figures 1 and 2 represent sectional elevations, at right angles to each other, of an apparatus or machine for making India-rubber or other like tubes, in accordance with my invention, and Figure 3 a sectional plan through the line $x\,x$ in fig. 2.

In the ordinary, or heretofore only successful mode of making India-rubber tubing, it has been customary, first, to roll out the rubber into sheets of the required thickness, by passing it through heated calender-rolls, and then to cut it into strips of the proper width, according to the diameter of tube required, after which the strips, in succession, have been closed round a mandrel of bar-iron, uniting the edges of the strip by benzine, and drawing the two edges together with the fingers, and afterwards passing a small grooved roller over the seam, for the purpose of smoothing it. A strip of cotton cloth is then wrapped round the whole, when the tubing thus formed is ready for curing.

Various attempts have been made, from time to time, to establish a different mode of manufacture, by compressing the rubber, while in a plastic state, within a cylinder, round a core having a fixed relationship to the tubing, as it is forced through a die or former out round the core; but this method, however practicable for making tubes of other plastic substance than rubber, has not answered in working this latter material, by reason of the peculiar properties of such gum, which make a fixed core arrangement, under such mode of operation, objectionable or impracticable, and the tube buckling or collapsing, for want of a proper support, when or as and after it is passed out through the die. Much time also is lost, and an inconvenient amount of space required under such mode of working, and this objection applies to tubing so made from other gums or material than rubber, by reason of the length of stroke it has heretofore been necessary to give the compressing-ram or rams, over and above their stroke within the cylinder or cylinders, to facilitate the charging of the latter, or feeding in of the plastic material in bulk.

These objections to the system of working just referred to, the present improvement obviates, and my invention consists, first, in the employment of two gum-compressing rams, made capable of swinging on a centre, as, for instance, around, as a common axis, the hydraulic ram or plunger, or extension from it, through which the necessary power and action are communicated to the gum-rams, whereby, as these latter emerge from their cylinders, they may, without any extra elevation or motion, be swung to one side, out of the way, and a convenient space thereby afforded for packing or charging the cylinders with the material to be compressed.

And my invention further consists in the employment of a travelling core, arranged to pass through the hollow core and die, between and at the bottom of the gum-cylinders, transversely to the axial lines of the rams, and fed or moving along with the tubing, as it is formed and issues from the die, which, among other advantages, prevents buckling and collapsing, as hereinbefore referred to.

In this description, it will suffice to speak of pure or unalloyed rubber as the gum being worked.

Referring to the accompanying drawing, A represents the water-ram to the machine, which works under hydraulic pressure. B B are two gum-compressing rams, connected therewith by a central pivot or bolt, C, and locked with the same, when making their up-and-down stroke, by a key, $a$, or other suitable attachment. By employing two rams the gum is equally distributed on opposite sides of the core. D D are the gum-cylinders. Arranged across the bottom of these gum-cylinders, or in a chamber, E, at foot of the same, are the hollow core F and die G, lying in the same axial position, transversely to the axes of the rams, and adjustable by a screw-thread construction of them, or otherwise, relatively to each other. H is the travelling core, which passes through the core F and die G.

To charge the cylinders D D with gum or rubber, the rams B B, when elevated just so that they clear the tops of said cylinders, are detached from lock with the water-ram A, in order that they may be swung out of the way, as represented by red lines in fig. 3, which leaves the cylinders clear, and gives free and ample space for feeding in the gum without any special elevation of the rams, whereby labor and time are economized, and space necessary to work the machine reduced. And here it may be remarked that the gum, forming a tough mass, requires to be well packed and kneaded into the cylinders, to expel air, which, if left, would produce holes in the tube. After the cylinders are charged, the rams B B are swung round on their pivot, C, and locked to their place, in line with the cylinders D D, and pressure applied.

From this description it will be seen that the gum is forced through between the hollow core F, on its outside, and die G, to its interior, and thus passing, is received on the travelling core H, which is carried along with and supports the rubber tube, or is fed and worked so as to be delivered with the tube as it is formed and issues from the die, and which keeps the tube from injury as it passes out of the die, and from buckling or collapsing. By adjusting the hollow core F and die G relatively to each other, the thickness of the tube and freedom on the travelling core H may be regulated. The tube thus formed, with the travelling core in it, is then ready for curing. The travelling core H may either be a solid rod or tube, and, if the latter, either made close or of a perforated character. The rubber tube, when cured, may be freed from the travelling core H, by forcing air or water through a connecting-coupling, constructed to spread out the end of the tube, and serving to convey air or water, under pressure, through such spread-out portion, and around the core H; or where the latter is of a tubular and perforated character, by forcing air or water through it from the inside, to, in either case, separate the rubber tube from the core, or facilitate its removal therefrom.

What is here claimed, and desired to be secured by Letters Patent, is—

1. The rams B B, having a compressing action, in common with each other, and hung so as to be capable of being swung out of line with their cylinders, substantially as and for the purpose or purposes herein set forth.

2. The travelling core H, in combination with the hollow core F and die G, arranged for operation transversely, or thereabouts, to the axial line or lines of the gum-compressing ram or rams, essentially as shown and described, and for the purposes specified.

JOHN ROBERTSON.

Witnesses:
   J. W. COOMBS,
   A. LE CLERC.